April 23, 1935. R. W. BROWN 1,998,802
VULCANIZING APPARATUS
Filed Dec. 24, 1931 3 Sheets-Sheet 1

INVENTOR
Roy W. Brown
Ely & Barrow
ATTORNEYS

April 23, 1935.  R. W. BROWN  1,998,802
VULCANIZING APPARATUS
Filed Dec. 24, 1931  3 Sheets-Sheet 2
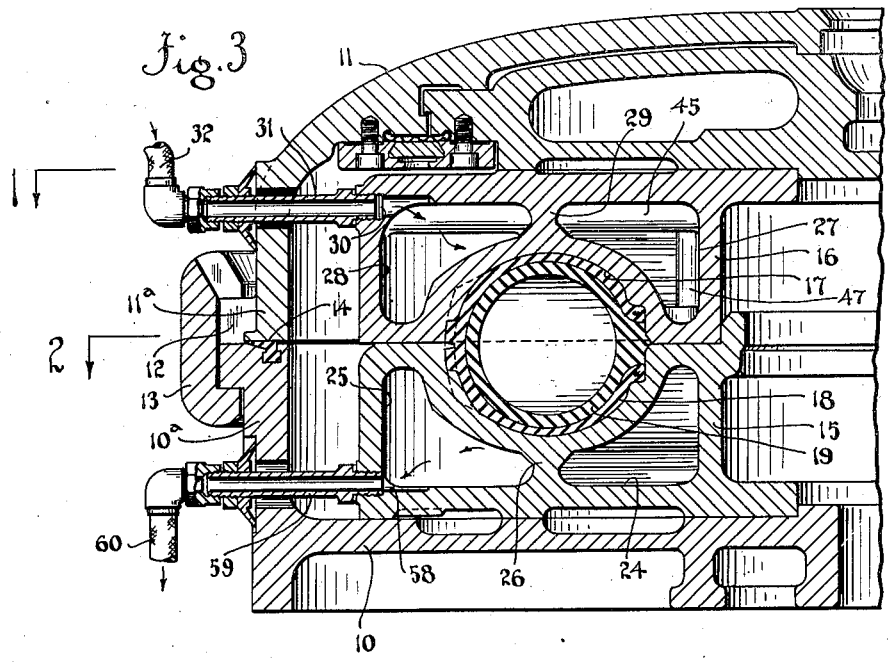
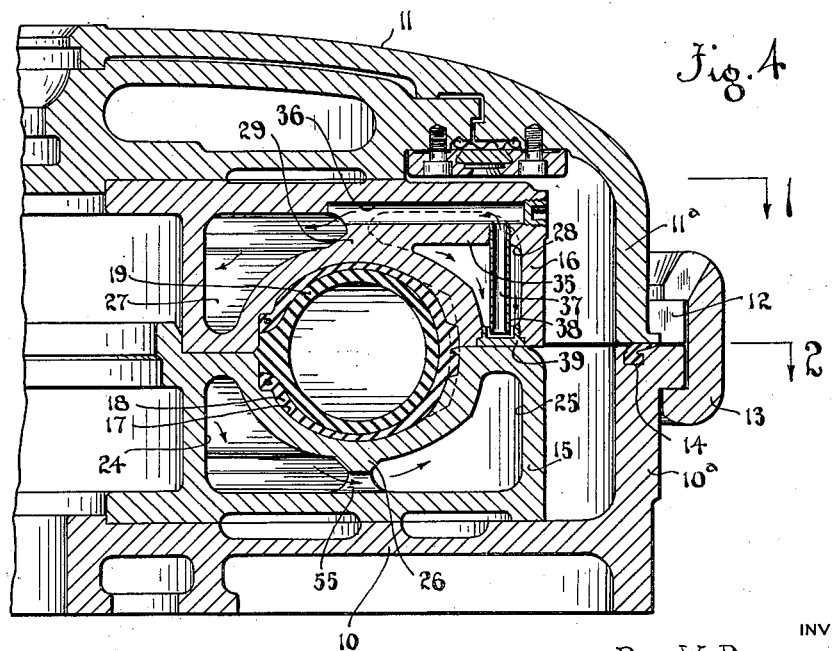
INVENTOR
Roy W. Brown
BY
Ely & Barrow
ATTORNEYS April 23, 1935.  R. W. BROWN  1,998,802
VULCANIZING APPARATUS
Filed Dec. 24, 1931   3 Sheets-Sheet 3

INVENTOR
Roy W. Brown

ATTORNEYS

Patented Apr. 23, 1935

1,998,802

UNITED STATES PATENT OFFICE 1,998,802

VULCANIZING APPARATUS

Roy W. Brown, Akron, Ohio, assignor to The Firestone Tire & Rubber Company, Akron, Ohio, a corporation of Ohio Application December 24, 1931, Serial No. 582,920

6 Claims. (Cl. 18—38)

This invention relates to vulcanizing apparatus, and more especially it relates to unit type vulcanizers such as are used in the rubber industry for vulcanizing annular articles such as tire casings and inner tubes. Such vulcanizers usually include separable mold sections, and it is to the improved heating of the mold sections that this invention primarily is directed.

The invention is an improvement in part upon my co-pending application for Vulcanizers, Serial No. 375,625, filed July 3, 1929 to which application reference is directed for details of construction not constituting a part of this invention.

The chief objects of the invention are to effect uniform heating of the mold sections; and to reduce the time required to bring the mold to vulcanizing temperature. Other objects will be manifest as the specification proceeds.

Of the accompanying drawings:

Figure 3 is a vertical section through the vulcanizer on the line 3—3 of Figure 1;

Figure 4 is a similar section through the vulcanizer on the line 4—4 of Figure 1;

Figure 1:
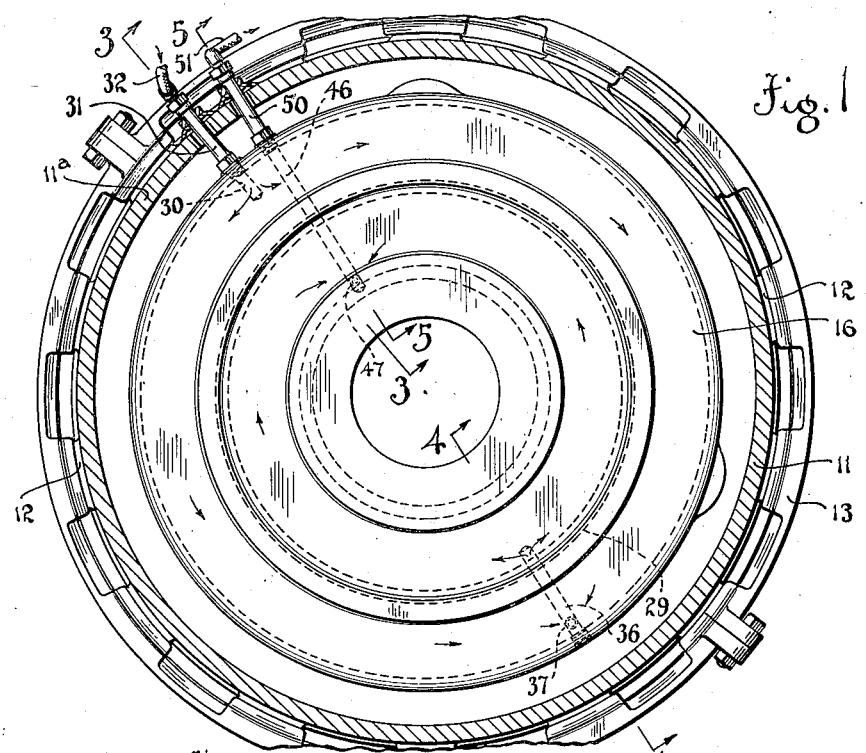
Figure 1 is a section on the line 1—1 of Figures 3 and 4 showing the upper mold section of the improved vulcanizing apparatus in plan.

Referring to the drawings, the vulcanizer comprises a lower vulcanizer section 10 and an upper vulcanizer section 11 which sections are hinged together at one side, suitable power means (not shown) being provided for raising and lowering the upper section to give access to the interior of the vulcanizer. The upper and lower vulcanizer sections are formed with circumferential side walls 10$^a$, 11$^a$ respectively, and the lower marginal portion of the wall 11$^a$ is formed with a circumferential series of spaced lugs 12, 12 that cooperate with complemental lugs formed on a locking ring 13 that is mounted upon the lower vulcanizer section 10, for locking the vulcanizer sections together. A lip gasket 14 may be mounted at the meeting edges of the respective vulcanizer sections.

The vulcanizer sections constitute a hollow structure within which is mounted an annular cavitary mold comprising a lower mold section 15 secured to the lower vulcanizer section 10, and an upper mold section 16 secured to the upper vulcanizer section 11, the parting plane of the mold sections being coincident with the parting plane of the vulcanizer. The mold is formed with the usual work-receiving cavity 17 which in the illustrative embodiment shown is a tire molding cavity, a tire casing 18 having an expansible core 19 therein being shown within said vulcanizing cavity. Suitable connections (not shown) are provided for conducting heated fluid under pressure to the expansible core 19.

The mold sections 15, 16 are of the stem-jacket type, that is, each section includes a chamber or chambers for the reception of heated vulcanizing fluid in heat-transfer relation to its molding cavity. In the lower mold section 15 there are respective inner and outer circumferential steam chambers 24, 25 separated by a medial circumferential wall 26, and in the upper mold section 16 there are respective inner and outer circumferential steam chambers 27, 28 separated by a medial circumferential wall 29.

The apparatus is constructed and arranged to effect the continuous flow of heating fluid, such as steam, through successive steam chambers 28, 27, 24 and 25 in the order named, and to this end the outer wall of the upper mold section 16 is apertured and threaded at 30, Figures 1 and 3, to receive a short length of pipe 31 that extends through the wall 11$^a$ of the upper vulcanizer section 11, and is connected exteriorly thereof to a flexible conduit 32 having connection with a source of supply of steam (not shown). The aperture 30 extends to the chamber 28 of the upper mold section whereby steam is first admitted to one side thereof.

At a point substantially diametrically opposite the fluid inlet 30, the top wall of the mold section 16 is locally thickened at 35 (see Figure 4) and formed with a passage 36 opening into the inner chamber 27 of the mold section. A short length of pipe or tubing 37 is threaded into the thickened portion 35, within the chamber 38, and communicates with the passage 36 therein, the lower end of the pipe 37 being disposed within a well 38, below the lower level of the chamber 28, said well being formed in a suitable plug 39 threaded through the lower wall of the mold section from the exterior thereof. The arrangement is such that steam from the chamber 28 may pass into the chamber 27 at a point remote from the inlet 30, the provision of the well 38 assuring that any condensate in the chamber 28 will be removed therefrom by the pressure of the steam.

Figure 5:
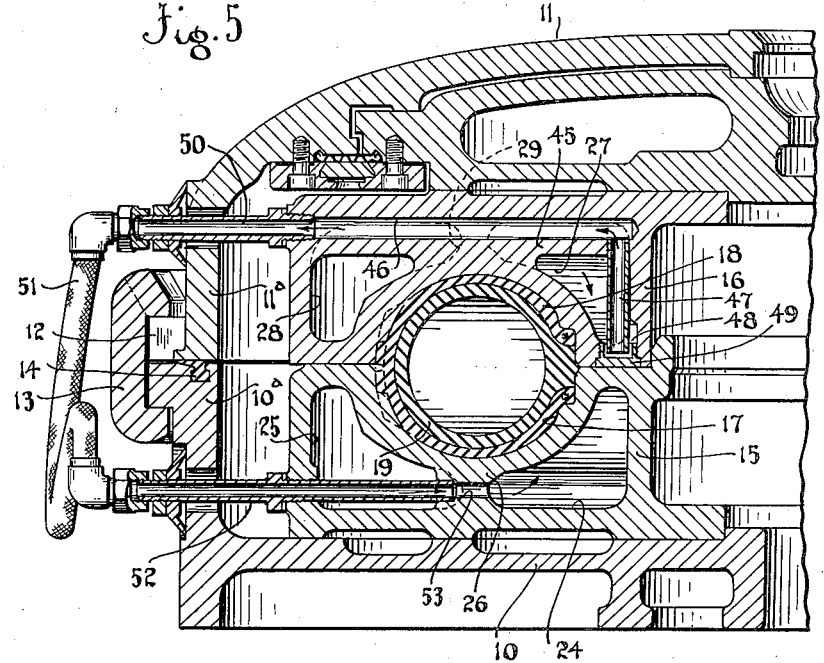
Figure 5 is a similar section through the vulcanizer on the line 5—5 of Figure 1.
Figure 6:
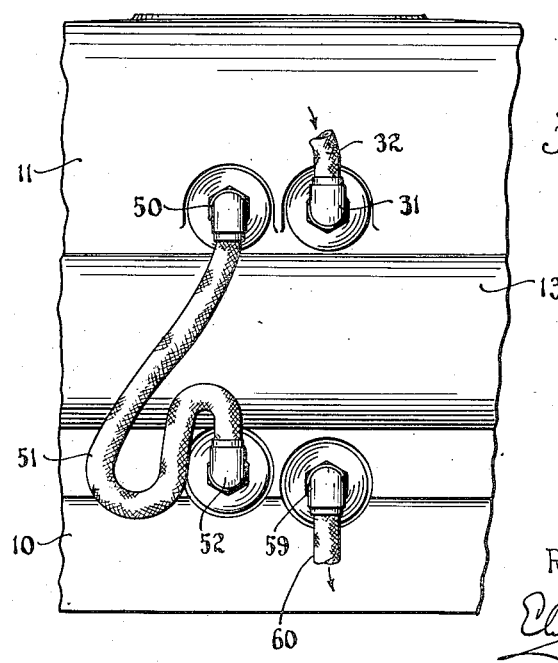
Figure 6 is a fragmentary side elevation of the vulcanizer showing piping thereto.

Means for venting steam from the inner chamber 27 is most clearly shown in Figure 5. At a point diametrically opposite the passage 36, adjacent the fluid inlet 30, the top wall of mold section 16 is formed with a radially arranged locally thickened portion 45 that extends across both cavities 27, 28, and a passage 46 is formed in said thickened portion, said passage extending inwardly from the outer face of the mold section. At the inner end of the passage, over the chamber 27, the thickened portion 45 is apertured and threaded to receive a short pipe or tube 47 that extends downwardly therefrom and has its lower end positioned within a well 48 below the lower level of the chamber 27, said well being formed in a suitable plug 49 that is threaded through the lower wall of the mold section from the exterior thereof. The arrangement provides for the venting of steam and condensate from the chamber 27 in the same manner as provided for the chamber 28. A short pipe 50 is threaded into the outer end of the passage 46 and extends through a suitable aperture in the wall 11a of the upper vulcanizer section 11. Exteriorly of the vulcanizer, a flexible conduit 51 connects the outlet pipe 50 with a pipe 52 that projects from the lower vulcanizer section 10, said pipe 52 constituting a fluid inlet for the lower mold section 15.

Figure 2:
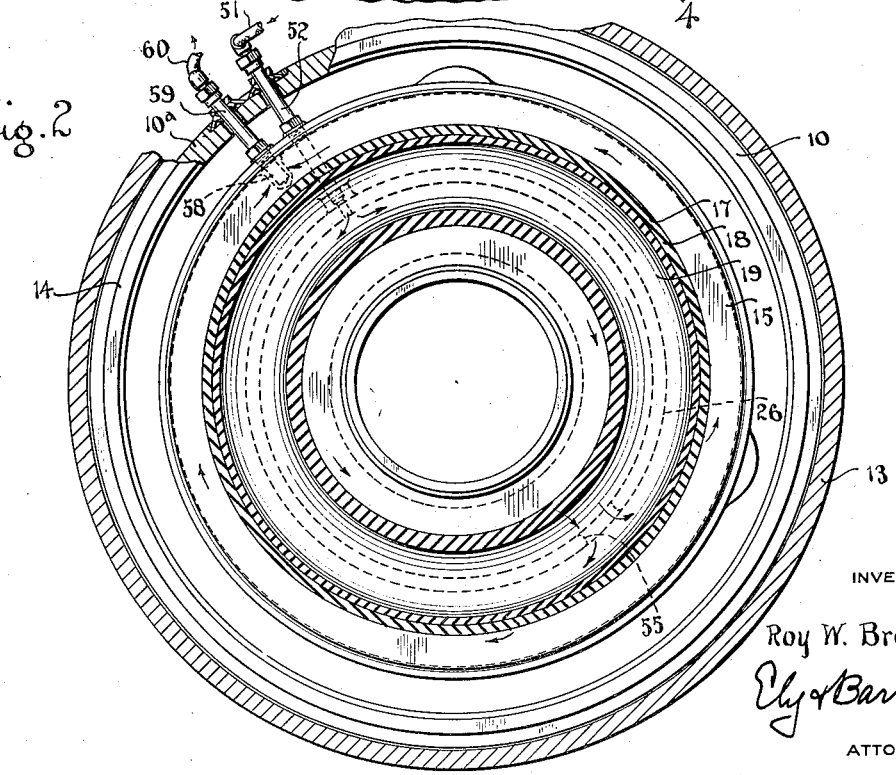
Figure 2 is a section on the line 2—2 of Figures 3 and 4 showing the lower mold section of the vulcanizer in plan, and the work therein, in section.

The pipe 52 is threaded through the outer wall of the lower mold section 15, near the bottom thereof, and traverses the lower part of the chamber 25, the inner end of the pipe having communication with the inner steam chamber 24 of the mold section through a passage 53 formed in the wall 26 that separates chambers 24, 25. At a point substantially diametrically opposite the passage 53, the wall 26 is formed with an aperture or passage 55 (Figures 2 and 4) through which steam from the chamber 25 may enter outer chamber 25, said passage being flush with the floors of said chambers so that condensate may flow therethrough.

For venting the chamber 25, the latter is provided with a port 58 diametrically opposite the passage 55, said port extending through the outer wall of the mold section 15, flush with or slightly below the bottom of the chamber 25 so as to assure a complete evacuation of water of condensation from the latter. Threaded into the port 58 is a short pipe 59 that extends through a suitable aperture in the wall 10a of the lower vulcanizer section 10, the pipe 59 being connected, exteriorly of the vulcanizer, with a flexible exhaust conduit 60 for conducting vulcanizing fluid and condensate away from the vulcanizer, as is most clearly shown in Figures 2 and 3.

It will be observed that the fluid inlet pipes 31, 52 are disposed radially with relation to the steam chambers 28, 24 so that steam entering said chambers flows uniformly in both directions to the outlets of the chambers. In the same manner steam entering chambers 27, 25 flows uniformly in both directions from the inlet ports to the outlet ports thereof, whereby uniform heating of the mold sections is effected. Preferably the conduits 32, 51 and 60 are located on the side of the vulcanizer adjacent the hinge, where there is least relative movement of the vulcanizer sections during the opening and closing of the vulcanizer.

In the operation of the apparatus, a pneumatic tire casing 18 with expansible core 19 therein is mounted in the vulcanizer in the usual manner, the expansible core being connected by means (not shown) to a source of pressure fluid such as steam or hot water, after which the vulcanizer is closed and locked as will be understood. Steam is then admitted to the mold sections 15, 16 through the single conduit 32, said steam passing in succession through the chambers 28, 27, 24, and 25, and being vented from the vulcanizer through the conduit 60. The steam may be permitted to flow constantly through the mold sections so that there is no loss of heat due to cooling during the mounting and removing of tires from the mold. Heated fluid under pressure is admitted to the expansible core 19 during the vulcanizing operation.

The invention provides perfectly for the circulation of steam through the mold sections so that there is no stagnation of the steam at any point with resulting local regions of lower temperature. In this apparatus the mold sections are quickly brought to vulcanizing temperature, and the temperature throughout the mold varies less than two degrees. But one valve is required to control the heating of the molds, and water of condensation is continuously and automatically removed therefrom.

Modifications may be resorted to within the scope of the appended claims, which are not limited wholly to the specific construction shown and described.

What is claimed is:

1. Vulcanizing apparatus comprising a mold having a fluid heating medium jacket, said jacket being formed with an inner passage and an outer passage surrounding said inner passage, a partition between said passages, an inlet conduit connected to one of said passages, and an adjacent outlet conduit connected to the other of said passages, said partition being formed with an aperture at a point remote from said inlet and outlet conduits, to provide a conduit between said inner passage and outer passage at a point removed from said inlet and outlet conduits.

2. Vulcanizing apparatus comprising a mold having a fluid heating medium jacket, said jacket being formed with an inner annular chamber and an outer annular chamber surrounding said inner chamber, a partition between said chambers, an inlet conduit connected to one of said chambers, and an adjacent outlet conduit connected to the other of said chambers, said partition being formed with an aperture diametrically opposite said inlet and outlet conduits, whereby the flow of said fluid heating medium passing from said inlet conduit to one of said chambers will be divided into two semi-annular paths about said chamber, will be joined when passing through said aperture and will then again be divided into two semi-annular paths while passing through the other of said chambers until joining again at said outlet conduit.

3. Vulcanizing apparatus comprising an annular mold having an annular cavity therein and a fluid heating medium jacket adjacent said cavity, said jacket being formed with an inner annular chamber and an outer annular chamber surrounding said inner chamber, a partition between said chambers, an inlet conduit connected to one of said chambers, and an adjacent outlet conduit connected to the other of said chambers, said partition being formed with an aperture diametrically opposite said inlet and outlet conduits, whereby the flow of said fluid heating medium passing from said inlet conduit to one of said chambers will be divided into two semi-annular paths about said chamber, will be joined when passing through said aperture and will then again be divided into two semi-annular paths while passing through the other of said chambers until joining again at said outlet conduit.

4. Vulcanizing apparatus comprising a pair of mold sections each having a fluid heating medium jacket, each of said jackets being formed with an inner passage and an outer passage surrounding said inner passage, a partition between said passages, an inlet conduit connected to one of said passages, and an adjacent outlet conduit connected to the other of said passages, said partition being formed with an aperture at a point remote from said inlet and outlet conduits, to provide a conduit between said inner passage and outer passage at a point removed from said inlet and outlet conduits, the outlet conduit of one of said mold sections being connected to the inlet conduit of the other of said mold sections.

5. Vulcanizing apparatus comprising a pair of mold sections each having a fluid heating medium jacket, each of said jackets being formed with an inner annular chamber and an outer annular chamber surrounding said inner chamber, a partition between said chambers, an inlet conduit connected to one of said chambers, and an adjacent outlet conduit connected to the other of said chambers, said partition being formed with an aperture diametrically opposite said inlet and outlet conduits, whereby the flow of said fluid heating medium passing from said inlet conduit to one of said chambers will be divided into two semi-annular paths about said chamber, will be joined when passing through said aperture and will then again be divided into two semi-annular paths while passing through the other of said chambers until joining again at said outlet conduit, the outlet conduit of one of said mold sections being connected to the inlet conduit of the other of said mold sections.

6. Vulcanizing apparatus comprising a pair of mold sections each having a fluid heating medium jacket, each of said jackets being formed with concentric inner and outer annular chambers, said mold sections being formed with a mold cavity, the walls of which are adapted to be heated by the fluid heating medium in said jacket, a partition between said chambers, an inlet conduit connected to one of said chambers, and an adjacent outlet conduit connected to the other of said chambers, said partition being formed with an aperture diametrically opposite said inlet and outlet conduits, whereby the flow of said fluid heating medium passing from said inlet conduit to one of said chambers will be divided into two semi-annular paths about said chamber, will be joined when passing through said aperture and will then again be divided into two semi-annular paths while passing through the other of said chambers until joining again at said outlet conduit, the outlet conduit of one of said mold sections being connected to the inlet conduit of the other of said mold sections.

ROY W. BROWN.